United States Patent [19]

F'Geppert

[11] Patent Number: 4,558,606
[45] Date of Patent: Dec. 17, 1985

[54] VARIABLE SPEED DRIVE

[75] Inventor: Erwin F'Geppert, Novi, Mich.

[73] Assignee: The United States of America as represented by the Secretary of the Army, Washington, D.C.

[21] Appl. No.: 519,876

[22] Filed: Aug. 3, 1983

[51] Int. Cl.⁴ .............................................. F16H 15/16
[52] U.S. Cl. .......................................... 74/193; 74/191
[58] Field of Search ........................... 74/191, 192, 193

[56] References Cited

U.S. PATENT DOCUMENTS

| 3,241,382 | 3/1966 | Temple | 74/191 |
| 3,688,594 | 9/1972 | Weber | 74/191 |
| 3,848,475 | 11/1974 | Tippmann | 74/192 |

FOREIGN PATENT DOCUMENTS

| 975064 | 3/1951 | France | 74/191 |

Primary Examiner—Ronald C. Capossela
Attorney, Agent, or Firm—Peter A. Taucher; John E. McRae; Robert P. Gibson

[57] ABSTRACT

A variable speed drive that uses cone clutch surfaces, and an adjusting mechanism for shifting certain ones of the cone surfaces parallel to the cone angle, thereby changing the speed ratio between the input and output members. The engaged clutch surfaces preferably comprise a relatively small diameter male clutch surface engaged with a relatively large diameter female clutch surface, such that a relatively large area engagement is achieved in all adjusted positions of the clutch system. The inventive system preferably includes an intermediate member between the input and output members; this intermediate member has two sets of clutch surfaces interengaged with clutch surfaces on the input and output members to produce a two step speed change from the input member to the output member.

1 Claim, 4 Drawing Figures

VARIABLE SPEED DRIVE

GOVERNMENT INTEREST

The invention described herein may be manufactured, used, and licensed by or for the Government for governmental purposes without payment to me of any royalty thereon.

BACKGROUND AND SUMMARY

This invention relates to a variable speed drive using conical drive elements. The drive is designed to have infinite speed ratio change capability (within limits) while attaining at least semipositive drive action (as opposed to friction drive action). Drive forces are transmitted through cone clutch mechanisms, each such mechanism having an external male clutch surface engaged with an internal female clutch surface; extensive clutch surface area engagements are achieved. In one position of adjustment each male clutch surface has a continuous three hundred sixty degree engagement with the female clutch surface for achievement of a locked drive connection.

THE DRAWINGS

Figure 1:
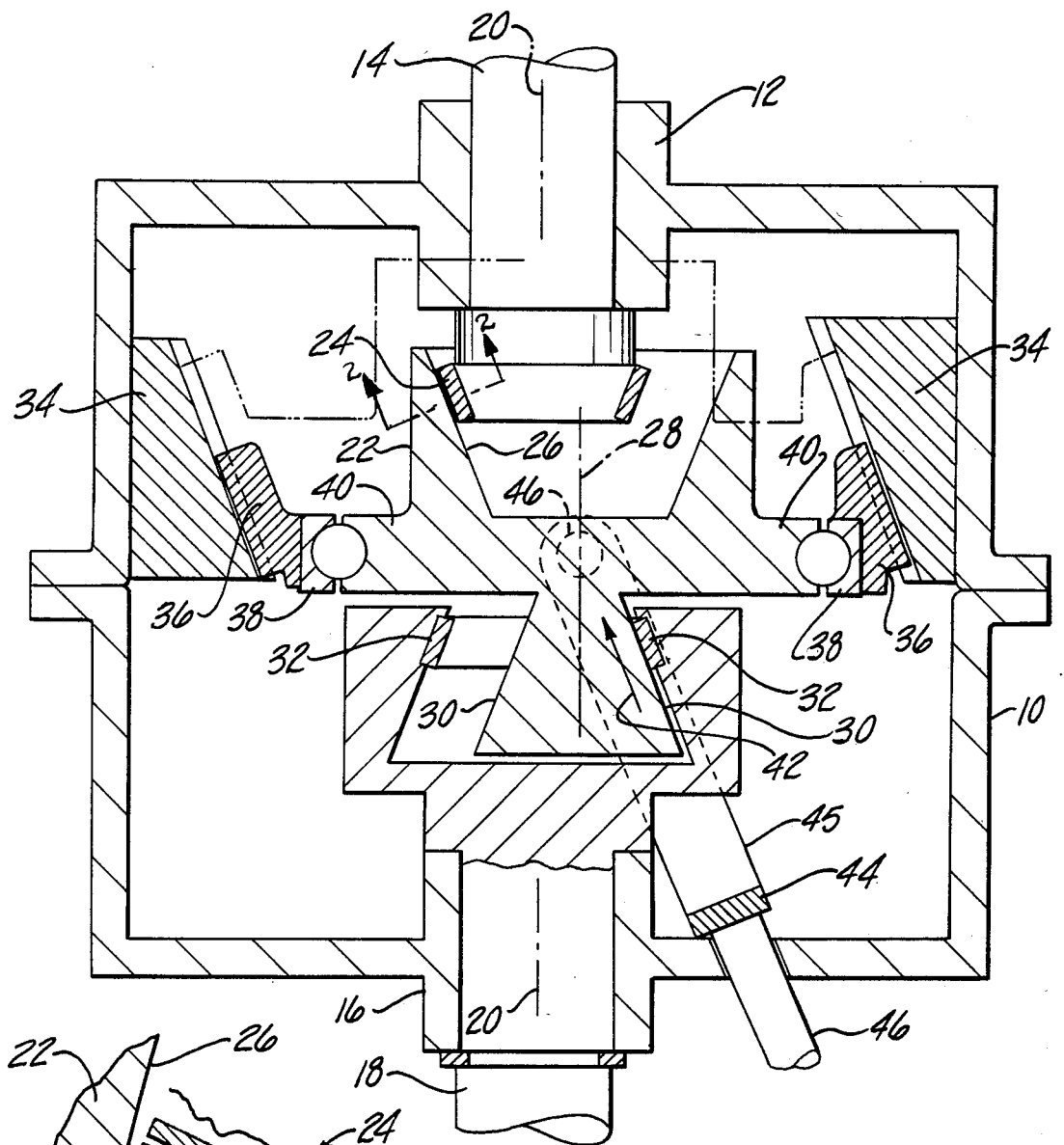
FIG. 1 is a sectional view taken through one embodiment of the invention.

Referring in greater detail to FIG. 1, there is shown a variable speed drive that includes a stationary housing 10 defining a bearing 12 for an input shaft member 14, and a bearing 16 for an output shaft member 18. Member 14 is sometimes referred to as the drive member. Member 18 is sometimes referred to as the driven member. Members 14 and 18 are arranged on a common rotational axis 20.

The space between members 14 and 18 is occupied by an intermediate drive transmission member 22. A male cone clutch element 24 on the lower end of drive shaft 14 engages a female conical drive surface 26 on member 22 for rotating member 22 around its rotational axis 28. The diameter of conical clutch element 24 is less than the diameter of engaged conical surface 26 so that member 22 rotates at a slower speed than member 14.

Member 22 has a male conical drive surface 30 engaged with an annular female cone clutch 32 carried by the upper end of shaft member 18; member 18 is thus rotated around its axis 20 at a slower speed than member 22. Relative speeds are proportional to the relative diameters of cone clutch 32 and the engaged area of drive surface 30. Two speed reductions can occur in the drive path from input member 14 to output member 18, i.e. a first speed reduction between members 14 and 22, and a second speed reduction between members 22 and 18.

The support mechanism for intermediate transmission member 22 comprises two diammetrically-opposed guide elements 34 suitably affixed to housing 10, and two cooperating slide elements 36 suitably affixed to a ring member 38. Ring member 38 forms part of an antifriction bearing assembly that includes a second inner ring 40 secured to member 22.

The sub-assembly comprised of slide elements 36, rings 38 and 40, and member 22, is adjustable along a pathline 42 that parallels the cone angle 26 or 30 (both cones have the same cone angle). The adjusting means comprises a yoke member 44 having opposed arms 45 connected to pins 46 extending outwardly from ring 38 in a plane midway between slide elements 36. A non-illustrated ball screw or pinionrack mechanism would be operatively connected to shaft 46 of the yoke member in order to provide the motive force for effecting incremental adjustments in the position of member 22. In any of its adjusted positions member 22 is free to rotate around its central axis 28.

Member 22 is shown in its most downward position of adjustment (closest to member 18) designed to achieve the maximum speed reduction between members 14 and 18. Member 22 can be adjusted upwardly along pathline 42 to a dashed line position (FIG. 1) wherein its rotational axis 28 coincides within rotational axis 20. In such a position member 22 rotates at the same speed as members 14 and 18; i.e. there is then no speed reduction.

The various cone clutch elements and cone drive surfaces are preferably sized so that the effective diameters of clutch elements 24 and 32 correspond to the smallest (minor) diameters of cone surfaces 26 and 30. When member 22 is in its upwardmost position of adjustment shown by the dashed lines in FIG. 1, the surfaces of the cone clutches will have continuous three hundred sixty degree engagements with cone surfaces 26 and 30. Member 22 will then be in a locked condition, i.e. rigidly connected to members 14 and 18 for conjoint rotation therewith.

Figure 2:
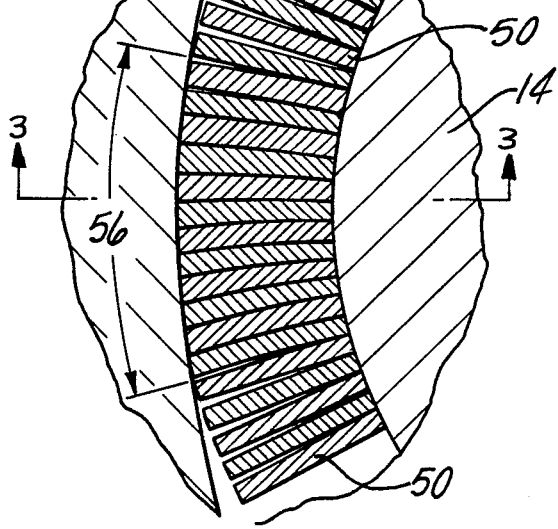
FIG. 2 is an enlarged fragmentary sectional view taken on line 2—2 in FIG. 1.
Figure 3:
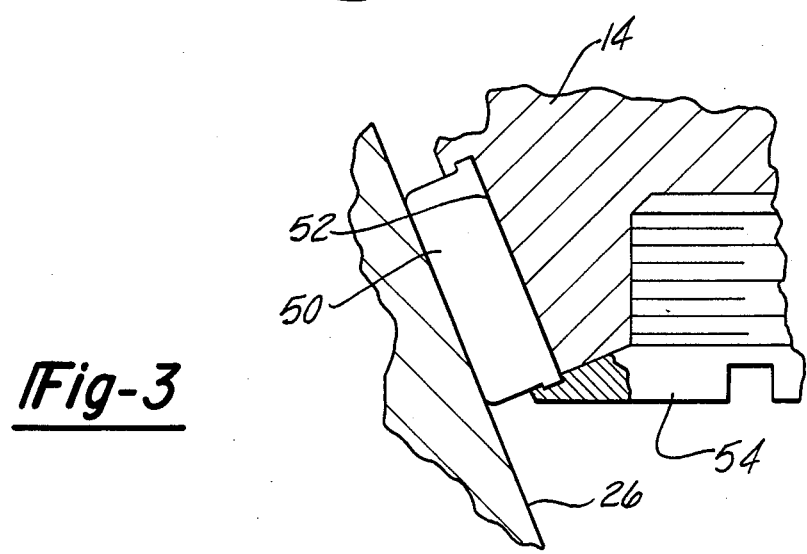
FIG. 3 is a reduced sectional view taken on line 3—3 in FIG. 2.

Clutch elements 24 and 32 may be constructed in various different ways. However, each clutch element preferably exhibits a deformable conical drive surface for increasing the effective surface area and contact pressure. As shown in FIGS. 2 and 3, clutch element 24 is defined by a series of radial spring leaf strips 50 packed tightly together in an annular recess 52 formed in the lower end area of shaft 14; a screw 54 may be used to retain the spring leaf strips within recess 52.

The offset between axes 20 and 28 is selected so that the radius of the deformable clutch element surface (measured from axis 20) is slightly greater than the radius of cone surface 26 (measured from axis 28). Therefore incremental clutch element surfaces are required to sequentially deform as they roll along cone surface 26. Numeral 56 denotes the deformed surface area with one particular offset of axes 20 and 28 manufactured into the system. Drive contact pressure is affected not only by the offset of axes 20 and 28 but also by the thickness and spring deflection properties of leaf strips 50.

The spring leaf strips 50 are oriented to be deformable in planes normal to the opposing cone surface but to be rigid in directions parallel to the cone angle surface. The aim is to achieve high contact pressure while still being able to have relative slidable motion of cone surface 26 along the edges of the leaf strips, e.g. by application of a control force to shaft 46 (FIG. 1).

FIGS. 2 and 3 illustrate one method for constructing deformable male clutch element 24. A slightly different method of construction would be required to form the deformable female clutch element 32. In that case it would probably be necessary to employ reduced height spacer strips between the spring leaf strips in order to provide free spaces for accommodating the buckling action associated with spring leaf deformation.

Figure 4:
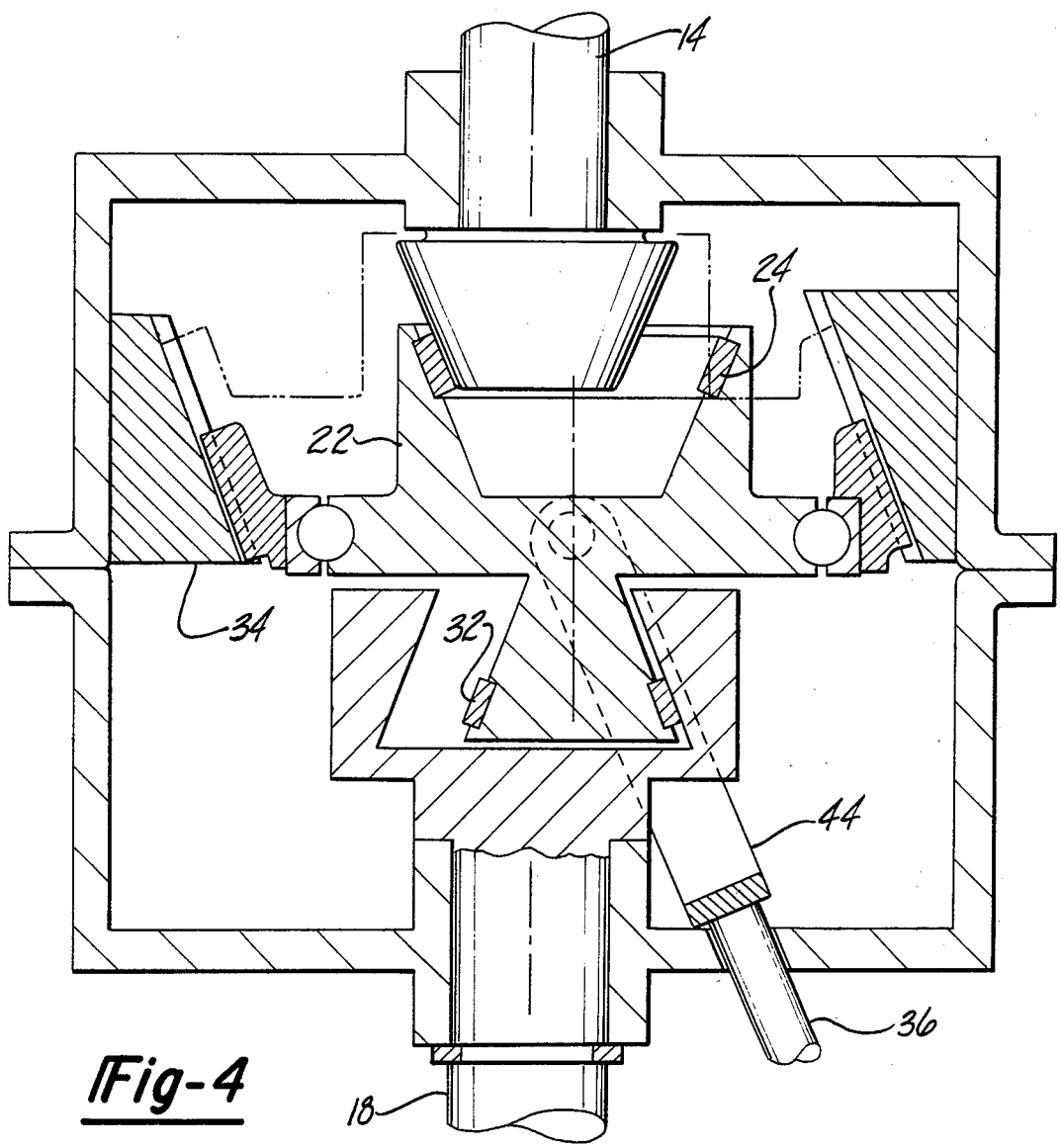
FIG. 4 is a sectional view taken through a second embodiment of the invention.

FIG. 1 illustrates an arrangement wherein the deformable clutch elements are mounted on the shafts. It is possible to have an arrangement wherein the deformable clutch elements are carried by intermediate member 22. FIG. 4 shows such an arrangement. General operation of the FIG. 1 and FIG. 4 arrangements is similar. In both cases the speed ratio is adjustable by application of a control force to the yoke member shaft 46. The design of the system permits infinite variation of the speed ratio within the upper and lower limits defined by the cone diameters. Speed ratio adjustment can be accomplished without stopping input shaft 14 or changing its absolute speed.

FIGS. 2 and 3 show one form of clutch mechanism usable in practice of the invention. Other types of clutch mechanisms can be used, e.g. sprague type clutches and roller type overrunning clutches. Preferably the clutch mechanism is of a type providing high contact pressure on the opposing cone surface for achieving at least a semi-positive drive action, rather than merely a light friction drive action.

I wish it to be understood that I do not desire to be limited to the exact details of construction shown and described for obvious modifications will occur to a person skilled in the art, without departing from the spirit and scope of the appended claims.

I claim:

1. A variable speed drive comprising a rotary drive shaft and a rotary driven shaft axially spaced from one another on a common rotational axis; an intermediate floating force-transmitting member arranged between the drive shaft and driven shaft for selective rotation on a plurality of axes that are parallel to the first mentioned axis;

a first male conical drive element carried on one of said shafts, and a first female conical drive element carried on the intermediate force-transmitting member in frictional engagement with the first male element;

a second female conical drive element carried on the other shaft, and a second male conical drive element carried on the intermediate force-transmitting member in frictional engagement with the second female element;

the first female element and second male element being located on opposite faces of the force-transmitting member in axial alignment with one another for operative engagement with different ones of the conical elements carried by the axially spaced shafts; the conical elements having the same cone angle;

means floatably supporting the force-transmitting member, said support means comprising stationary guide means (34) having a guide direction that is parallel to the profile angle of the conical drive elements; said support means further comprising an annular ring (38) oriented in a plane normal to the common rotational axis of the drive and driven shafts, and slide elements (36) carried on said ring in slidable engagement with the stationary guide means whereby said ring can be adjusted in a direction parallel to the profile angle of the conical drive elements while maintaining its plane normal to the shaft axis; said force-transmitting member being concentrically arranged on said annular ring for rotation around the ring axis, such that adjustment of the ring parallel to the profile angle of the conical drive elements serves to vary the rotational axis of the force-transmitting member;

and adjusting means connected with the aforementioned ring for adjusting the intermediate force-transmitting member to or from a position wherein the rotational axis of the intermediate member coincides with the common rotational axis of the drive and driven shafts; the conical drive elements being dimensioned so that when the rotational axis of the intermediate member coincides with the common rotational axis of the drive and driven shafts the male drive elements have continuous three hundred sixty degree engagement with the female drive elements.

* * * * *